United States Patent [19]

Branger

[11] Patent Number: 4,459,626

[45] Date of Patent: Jul. 10, 1984

[54] MAGNETIC TAPE TRANSDUCING APPARATUS

[75] Inventor: Moritz Branger, Los Altos, Calif.

[73] Assignee: Ampex Corporation, Redwood City, Calif.

[21] Appl. No.: 297,384

[22] Filed: Aug. 28, 1981

[51] Int. Cl.³ .............................................. G11B 15/60
[52] U.S. Cl. ................... 360/130.22; 360/84
[58] Field of Search ...................... 360/130.22–130.24, 360/71, 84, 102, 103, 107, 128

[56] References Cited

U.S. PATENT DOCUMENTS

| | | | |
|---|---|---|---|
| 3,435,441 | 3/1969 | Stahler | 360/130.22 |
| 3,534,182 | 10/1970 | Prochnow | 360/84 |
| 3,592,976 | 7/1971 | McGinnis | 360/130.22 |
| 4,040,110 | 8/1977 | Bagby | 360/130.22 |
| 4,100,585 | 7/1978 | van Slageren | 360/130.23 |

*Primary Examiner*—John H. Wolff
*Attorney, Agent, or Firm*—Charles M. Carman, Jr.; Joel D. Talcott

[57] ABSTRACT

A magnetic tape is guided past a transverse-scan rotating transducing head drum which is shaped to create an air bearing film between the drum and tape, so that only the tips of the heads themselves engage the tape. To avoid adverse influence on the air bearing, the guide means is arranged to engage the tape only at points remote from the plane of the head drum, and to induce at these points a transverse curvature in the tape that is of smaller radius than that of the head drum, ensuring that the tape rests closely on the air bearing across the entire tape width.

11 Claims, 9 Drawing Figures

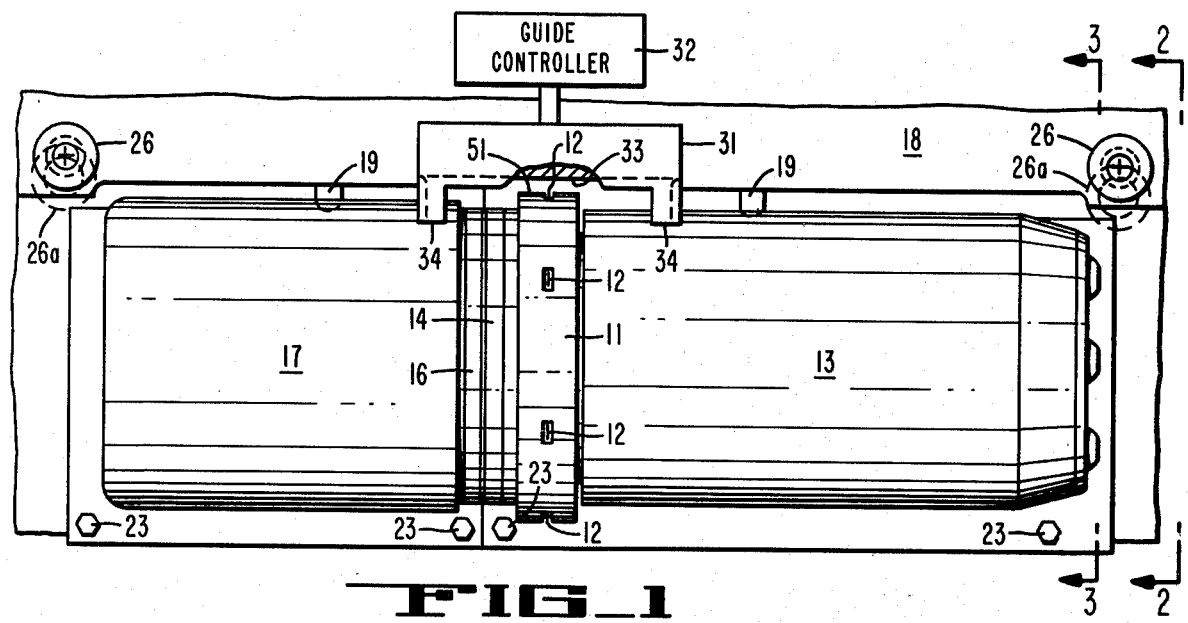
FIG_1
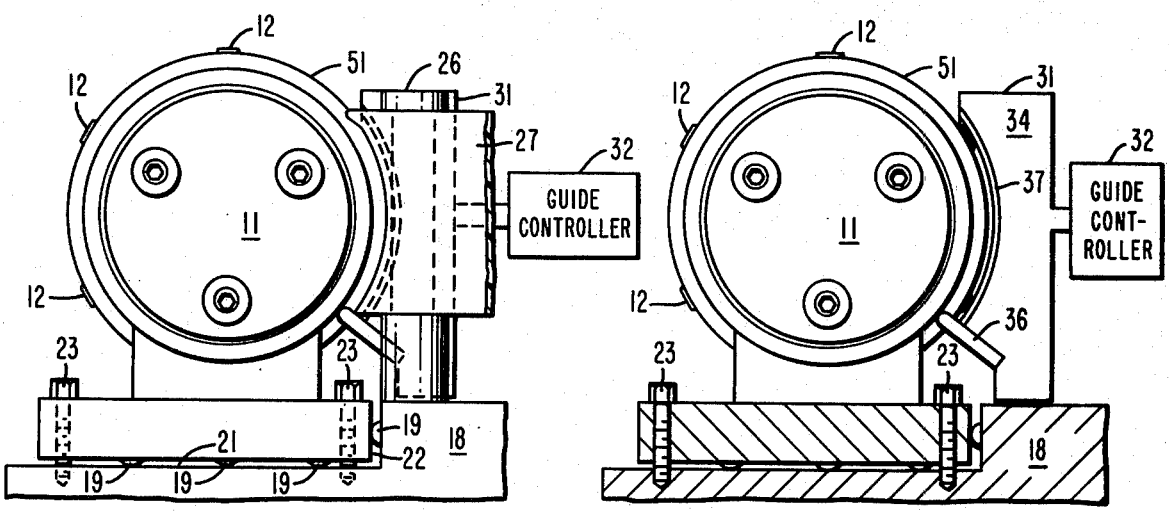
FIG_2  FIG_3
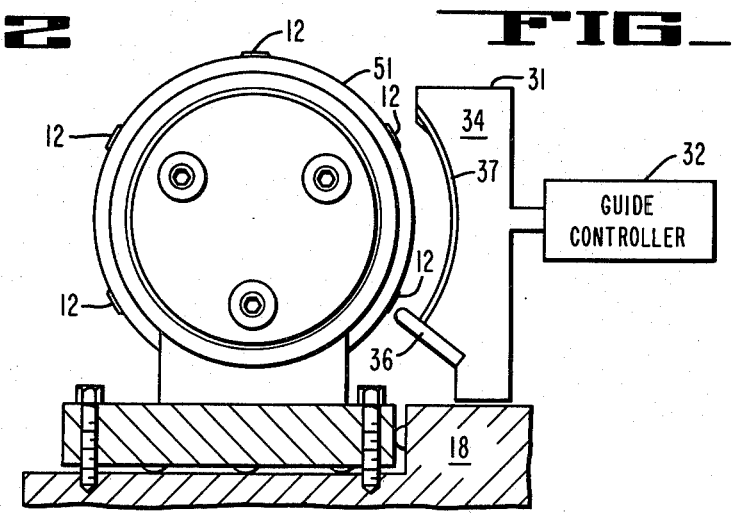
FIG_4

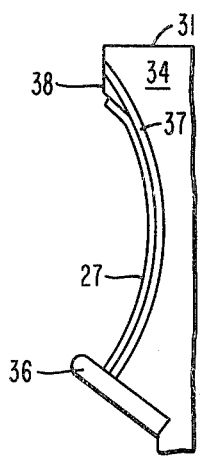
FIG_5
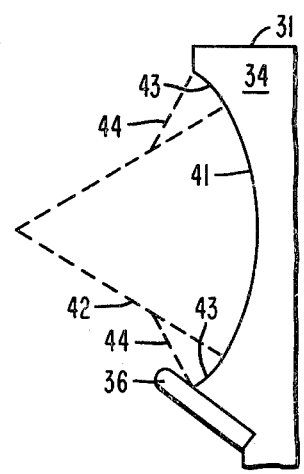
FIG_6
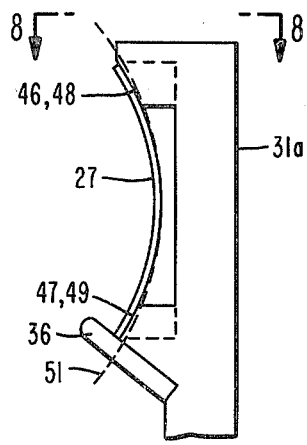
FIG_7
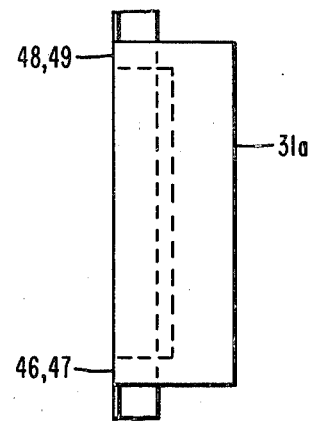
FIG_8
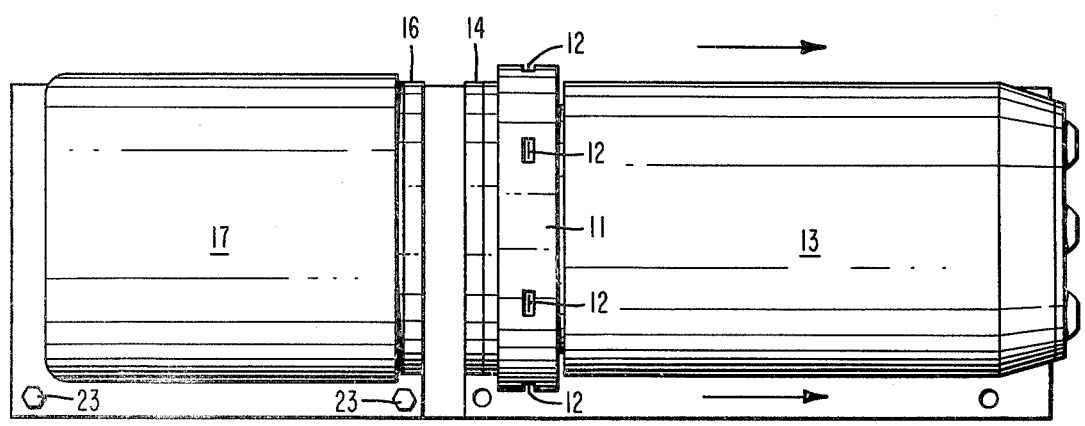
FIG_9

MAGNETIC TAPE TRANSDUCING APPARATUS

BACKGROUND OF THE INVENTION

This invention relates to magnetic tape transports, and particularly to tape transducing apparatus therefor.

Various so-called "female" guides have been used in the art to cause the tape to cup snugly around a transversely-scanning rotating head drum. Usually such guides provide solid backing for the tape directly in the plane of the rotating head drum or very close to it, so that an air bearing between the drum and tape would be impossible to form. Usually, also, the drum is shaped to a circumferential V-shaped with the point of the "V" confronting the tape, likewise rendering impossible the formation of an air bearing; and the heads themselves usually project radially away from the drum for many multiples of the maximum thickness of any air bearing that could be formed, at the controlling parameters that are usually feasible for magnetic tape transports in the present state of the art (these parameters being tape tension and speed, and the rotational speed and curvature of the head drum); consequently, even if an air bearing film could be formed, the heads would lift the tape so far above the film that the film would be vented and destroyed.

Of course, in these examples of the art, it may be said that an air bearing was neither contemplated nor desired, and that the desirable object of avoiding frictional contact between tape and drum is achieved by other means. However, the guiding apparatus of these prior art devices has been found to be far more complex to manufacture and to operate, and subject to more precise constraints in operation, than the simple air bearing of the present invention, and its also very simple tape guiding means.

Accordingly, it is an object of the present invention to provide a fluid bearing between a magnetic tape and a transversely rotating head drum.

SUMMARY OF THE INVENTION

A magnetic tape is guided past a transverse-scan rotating transducing head drum which is shaped to create an air bearing film between the drum and tape, so that only the tips of the heads themselves engage the tape. To avoid adverse influence on the air bearing, the guide means is arranged to engage the tape only at points remote from the plane of the head drum, and to induce at these points a transverse curvature in the tape that is of smaller radius than that of the head drum, ensuring that the tape rests closely on the air bearing across the entire tape width.

DESCRIPTION OF THE DRAWINGS

FIG. 1 is plan view of a magnetic tape guiding and transversely rotating head drum apparatus, in accordance with the present invention;

FIG. 2 in an end elevational view taken on the plane of lines 2—2 of FIG. 1;

FIG. 3 in a cross-sectional elevational view taken on the plane of lines 3—3 of FIG. 1;

FIG. 4 is a cross-sectional elevational view taken similarly to FIG. 3 but with the guide portion in retracted position;

FIG. 5 is a fragmentary elevational view, to a larger scale, of the guide portion of FIGS. 1-5, with the tape in place;

FIG. 6 is a fragmentary elevational view of another embodiment of the guide of FIG. 5;

FIG. 7 is a fragmentary elevational view of still another embodiment of the guide of FIG. 5;

FIG. 8 is a fragmentary plan view taken on the plane of lines 8—8 of FIG. 7; and FIG. 9 is a plan view similar to FIG. 1, with a portion of the apparatus partly removed.

DESCRIPTION OF THE PREFERRED EMBODIMENT

Referring now to the drawing, and particularly to FIG. 1 thereof, there is shown a rotating head drum 11, bearing a number of magnetic transducing heads 12. The drum 11 is mounted for rotation on the shaft (not shown) of an electric motor 13, and a rotating transformer half 14, also mounted on the shaft of motor 13, transmits the signals from (or to) heads 12 to (or from) a stationary transformer half 16, which in turn is mounted on a fixed housing 17. The housing 17 and motor 13 are precisely positioned on a base plate 18 by means of gauge elements 19 (FIG. 2) engaging gauge faces 21, 22 on the plate 18 and on the housing and motor bottoms, respectively. Bolts 23 secure the housing 17 and motor 13 to the base plate 18, and as shown in FIG. 9, the rotating heads 12, drum 11, motor 13 and rotating transformer half 14 can be retracted (as shown) and then entirely removed as a unit for replacement or repair, without disturbing the housing 17, the circuits contained within it, or the fixed transformer half 16, merely by removing the bolts 23 associated with the motor 13.

To guide the tape past the head drum 11, a pair of fixed guide posts (or rollers) 26 are mounted on the base plate 18 upstream and downstream from the drum. The positions of these parts are shown in FIGS. 1, 2 and 4 as such that the tape stretched between the parts can be rapidly transported, e.g., in fast shuttle mode. past the head drum, without frictionally engaging the heads 12 or the drum 11. In effect, the parts lie outside the imaginary cylindrical envelope of the head drum and head rotation.

For use in play-record mode, however, the tape 27 (FIG. 2) must be cupped around the head drum 11 so that the heads 12 will engage the tape across its entire width.

In the present invention, it is desired to cup the tape for this purpose without engaging the tape directly behind or opposite to the head drum, in order to avoid interfering with the establishment of an air bearing between the tape and drum, as will be later described.

To provide the cupping effect described at the head drum 11, the present invention employs a new principle, which is to cup the tape upstream and downstream from the head drum to a smaller radius of curvature than that of the head drum, as illustrated in FIG. 2. A guide member 31 is provided, mounted and controlled by a guide controller 32 for movement between a retracted position (FIG. 4) and an operating position (FIGS. 1-3), in which the smaller-radius curve of the tape at the upstream and downstream extremities of guide 31 lies either entirely within the imaginary cylindrical envelope of head revolution, or at least, is tangent to this envelope at the midline of the tape (see FIG. 2).

As shown in FIG. 1, the guide 31 achieves these ends by having a mid-portion 33 that is quite remote from drum 11, and two guide portions 34 at the upstream and downstream extremities of the guide 31. The portion 34

(FIGS. 3 and 5) each have a projecting lower tape edge guide 36, and is formed to a concave circular curved shape 37 of about the same radius as the drum, but has a button 38 at the upper extremity for engaging the back of the tape and forcing it to a curvature (FIG. 5) more acute than that of the drum. The extent to which the guide 31 must be moved toward the drum to produce an optimum effect is controlled by the controller 32.

It will be seen therefore that, in effect, the guide 31 of FIGS. 1–5 engages the tape only at points that are spaced at a substantial distance from the plane of head rotation, this distance being taken in an axial direction of the head drum.

In the guide of FIG. 5, the tape engages the guide portion 34, in effect, in two spaced apart zones represented by the button 38 and part of the curved edge 37 below the button.

FIG. 6 illustrates a different form of the guide curve in which the mid-portion 41 is formed at a larger radius of curvature 42 than are the extremities 43 which have a shorter radius of curvature 44.

In this case the tape can be engaged at all points of the guide curve and the two zones of contact are contiguous and continuous.

For uses in which the tape need not be withdrawn from contact with the heads or head drum during fast shuttle mode, or in which there is no shuttle mode, it has been found advantageous to position the guide posts 26 more closely to the apparatus, as illustrated by the phantom posts 26a in FIG. 1, in which case the guide portions 34 engage the tape in two non-contiguous zones, as illustrated by the guide 31a of FIGS. 7 and 8. In this arrangement the tape 27 is engaged at two points 46, 47 on one side of the head drum (i.e., upstream or downstream), and at points 48, 49 on the other side.

In order to generate an air bearing film between the drum 11 and the tape between the guide portions 34, the drum is formed with a substantially right-circular-cylindrical surface 51 (FIGS. 1 and 2) of substantial axial dimension confronting the tape. At tape tensions usual in the magnetic recording art, and at drum speeds suitable for television or broad-band signal recording and reproduction, the drum 11 may be expected to generate a self-acting pressurized air bearing film of about 50 to 200 micro-inches in thickness (see U.S. Pat. No. 2,998,499 issued Aug. 29, 1961 to A. R. Maxey, U.S. Pat. No. 3,170,045 issued Feb. 16, 1965 to Baumeister et al, U.S. Pat. No. 3,404,214 issued Oct. 1, 1968 to J. H. Streets et al), and the axial dimensions of the drum surface 51 should be at least several hundred times as great so that leakage of air laterally from the film will not appreciably deflate the bearing film (see U.S. Pat. No. 3,435,441, issued Mar. 25, 1969 to A. F. Stahler, particularly Column 3, line 65 to Column 4, line 15). In this example, the axial dimension of the drum is on the order of about a thousand times the film thickness. Thus, with respect to lateral flow, the tape and drum define an elongated restricted orifice in which the pressurized air of the bearing film does not lose its pressure.

Marking another difference over the prior art, the heads 12 are arranged to project radially beyond the drum surface 51 only slightly more than the expected thickness of the air bearing film, so as to engage the tape and to lift the tape away from the drum, and air film, only in a local zone of substantially smaller lateral dimension than the axial dimension of the drum surface 51. In other words, it is desired, and arranged, not to lift the tape so far away from the drum surface as to destroy the restricted-orifice effect, thus venting the pressurized air film laterally and deflating the bearing.

Thus there has been described an apparatus in which a magnetic tape is guided past a transverse-scan rotating transducing head drum which is shaped to create an air bearing film between the drum and tape, so that only the tip of the heads themselves engage the tape. To avoide adverse influence on the air bearing, the guide means is arranged to engage the tape only at points remote from the plane of the head drum, and to induce at these points a transverse curvature in the tape that is of smaller radius than that of the head drum, ensuring that the tape rests closely on the air bearing across the entire tape width.

What is claimed is:

1. Apparatus of the type including means for moving a magnetic tape longitudinally under tension and in transducing relation to a rotating transducing head drum, said apparatus including means for generating a fluid bearing film between said drum and tape, the thickness of said fluid bearing film being at least in part a function of the drum radius and speed of rotation parameters and an inverse function of the tape tension parameter circumferentially of said drum, comprising:

means for mounting the drum in generally axially parallel alignment with the tape length, so that said transducing heads sweep the tape transversely to said length thereof; and guide means engaging said tape only at points that are spaced at a substantial distance from the plane of drum rotation, said distance being taken in an axial direction of the head drum, for urging transverse cupping of said tape at said drum toward engagement with said drum across the entire width of said tape at said drum; whereby said tape tension circumferentially of said drum is developed from, and in cooperation with, said means for moving the tape longitudinally under tension, and whereby all of said parameters are fulfilled for maintaining said fluid bearing film at a predetermined minimum thickness between said tape and drum.

2. Apparatus as described in claim 1, wherein said guide means is arranged to urge transverse cupping of said tape at said engagement points therewith, and to a substantially smaller radius of curvature than that of said drum.

3. Apparatus as described in claim 2, wherein said guide means engages said tape at said points both upstream and downstream from said drum in the direction of motion of said tape.

4. Apparatus as described in claim 3 wherein said drum has a substantially right-circular-cylindrical surface of substantial axial dimension confronting said tape to facilitate the establishment and maintenance of said air bearing film without deflation by leakage of air in an axial direction from said film.

5. Apparatus as described in claim 4, wherein said transducing head means includes at least one magnetic head protruding from said drum surface sufficiently far to engage said tape and to lift said tape away from said drum and said air bearing film only in a local zone of substantially smaller lateral dimension than said axial dimension of said cylindrical drum surface.

6. Apparatus as described in claim 3, wherein said guide means engages said tape only adjacent the tape edges at a first pair of points spaced upstream and downstream from said drum, and at a second pair of points spaced upsteam and downstream from said drum, at least one of said pair of points lying within the imaginary cylindrical envelope of said drum.

7. Apparatus as described in claim 6, wherein first and second tape guide elements are provided respectively upstream and downstream from said guide means, said elements lying at least partly within the imaginary cylindrical envelope of said drum.

8. Apparatus as described in claim 3, wherein said guide means engages said tape at two transversely co-planar first zones upstream from said drum, and two transversely co-planar second zones downstream from said drum, said first and second zones lying within the imaginary cylindrical envelope of said drum.

9. Apparatus as described in claim 8, wherein third and fourth tape guide elements are provided respectively upstream and downstream from said guide means, said elements lying outside the imaginary cylindrical envelope of said drum.

10. Apparatus as described in claim 8, wherein said first and second zones are, respectively, contiguous but of differing radii of curvature each from the adjacent zone.

11. Apparatus as described in claim 8, wherein said first and second zones are, respectively, separated and non-contiguous.

* * * * *